United States Patent [19]
Gegner

[11] Patent Number: 5,532,919
[45] Date of Patent: Jul. 2, 1996

[54] VARIABLE FREQUENCY, ZERO VOLTAGE SWITCHING, QUASI-RESONANT CONVERTERS WITH RESONANT BRIDGE SWITCH

[75] Inventor: Joel P. Gegner, Oak Park, Ill.

[73] Assignee: Motorola, Inc., Schaumburg, Ill.

[21] Appl. No.: 40,234

[22] Filed: Mar. 30, 1993

[51] Int. Cl.$^6$ .................................................. H02M 3/10
[52] U.S. Cl. ........................................ 363/124; 363/132
[58] Field of Search ............................. 363/17, 98, 132, 363/124

[56] References Cited

U.S. PATENT DOCUMENTS

| | | | |
|---|---|---|---|
| 4,095,166 | 6/1978 | Shibata et al. | 363/124 |
| 4,408,268 | 10/1983 | Peters et al. | 363/124 |
| 4,504,895 | 3/1985 | Steigerwald | 363/17 |
| 4,720,667 | 1/1988 | Lee et al. | 323/271 |
| 4,720,668 | 1/1988 | Lee et al. | 323/271 |
| 4,841,220 | 6/1989 | Tabisz et al. | 323/282 |
| 4,855,888 | 8/1989 | Henze et al. | 363/98 |
| 4,857,822 | 8/1989 | Tabisz et al. | 323/282 |
| 4,860,184 | 8/1989 | Tabicz et al. | 363/17 |
| 4,876,635 | 10/1989 | Park et al. | 363/17 |
| 4,953,068 | 8/1990 | Henze | 363/98 |
| 5,132,888 | 7/1992 | Lo et al. | 363/132 |
| 5,132,889 | 7/1992 | Hitchcock et al. | 363/17 |
| 5,157,593 | 10/1992 | Jain | 363/132 |
| 5,235,501 | 8/1993 | Stuart et al. | 363/17 |
| 5,287,261 | 2/1994 | Ehsani | 363/124 |

OTHER PUBLICATIONS

K. Liu and F. C. Lee, "Resonant switches—a unified approach to improve performances of switching converters," in *IEEE International Telecommunications Energy Conf. Proc.*, 51 1984, pp. 334–341.

K. H. Liu and F. C. Lee, "Zero-Voltage Switching Technique in DC/DC Converters," i IEEE Trans. On Power Electronics, vol. 5, No. 3, Jul. 1990, pp. 293–304.

O. D. Patterson, D. M. Divan, "Pseudo-Resonant Full-Bridge DC-DC Converter," *IEEE Power Electronics Specialists Conf. Rec.*, 61 1987, pp. 424–430.

C. Q. Lee, S. Sooksatra, and Henry Lee, "Performance Characteristics of The Full-Bridge Zero-Voltage Switching PWM Resonant Converter," IEEE Transactions on Industrial Electronics, Dec. 1991, pp. 462–468.

I. Barbi, D. C. Martins, R. Prado, "Effects of Non-linear Resonant Inductor on the Behavior of ZVS Quasi-Resonant Converters," *IEEE Power Electronics Specialists Conf. Rec.*, 81 1990, pp. 522–527.

Vorperian, "Quasi-Square Wave Converters: Topologies and Analysis," *IEEE Trans. on Power Electronics*, vol. 3, No. 2, Apr. 1988, pp. 18314 191.

Dragan Maksimovic, and Slobodan Cuk, "Constant Frequency Control of Quasi—Resonant Converters," *IEEE Trans. on Power Electronics*, vol. 6, No. 1, Jan. 1991, pp. 141–150.

G. Hua, C. S. Leu, and F. C. Lee, "Novel Zero-Voltage-Transition PWM Converters," *IEEE Power Electronics Specialsts Conf. Rec.*, 31 1992, pp. 55–61.

H. J. Kim, C. S. Leu, R. Farringtn, and F. C. Lee, "Clamp Mode Zero-Voltage Switched Multi-Resonant Converters", IEEE Mar. 1992, pp. 78–84.

*Primary Examiner*—Jeffrey L. Sterrett

[57] ABSTRACT

A novel ZVS single-ended converter configuration is provided which eliminates high voltage stresses inherent in most ZVS circuits. The present invention incorporates a mechanism for passively limited all switch voltages to whatever voltage sources are present in the converter. The voltage limiting mechanism is maintained even when driving gate signals fail, thus yielding a reliable voltage clamping mechanism. In addition, the driving waveforms for the main and auxiliary switch may be essentially complementary, thus requiring a simple driving circuit. The invention is controlled by varying the switching frequency of the switches while maintaining a constant duty cycle for each switch.

8 Claims, 14 Drawing Sheets

-PRIOR ART-

-PRIOR ART-

-PRIOR ART-

-PRIOR ART-

-PRIOR ART-

-PRIOR ART-

-PRIOR ART-

-PRIOR ART-

-PRIOR ART- $F_S$=541KHz
$P_o$=33W

Lr=10uH
Crext=1200pF
fs=540KHz-810KHz $F_S$=809KHz
$P_o$=8W

VARIABLE FREQUENCY, ZERO VOLTAGE SWITCHING, QUASI-RESONANT CONVERTERS WITH RESONANT BRIDGE SWITCH

FIELD OF THE INVENTION

This invention relates generally to switching power converters and more generally to providing an improved switching apparatus for use therewith.

BACKGROUND OF THE INVENTION

Switching Power Converters have for many years served as a viable means for electrical energy conversion. Unfortunately, although the semiconductor devices used in these converters are operated in a manner similar to that of switches, undesirable energy dissipation internal to these conventional devices nevertheless occurs during turn-on and turn-off transitions. Such losses are due to the simultaneous existence of voltage across and current through the semiconductor devices during commutation. Because these losses occur at each switch transition, high frequency operation correspondingly yields low power conversion efficiencies.

Since higher switching frequencies generally result in smaller reactive components and improved dynamic performance, mechanisms for minimizing switching losses have long been sought after. For example, in conventional Pulse-Width-Modulated (PWM) switch-mode converters, energy recovery snubbers have been used to "soften" the switching of semiconductor devices. A technique known as "soft-switching" has also been implemented in switching power converters. This conventional technique seeks to eliminate switching losses by altering the switching conditions in such a way that the switch current or switch voltage is zero at the time of commutation.

In this way "Zero-Current-Switching" (ZCS) or "Zero-Voltage-Switching" (ZVS) respectively, is attempted. To implement this switching mechanism, an L-C network is added around the switch so that the switch current or switch voltage may be kept at a constant zero value during switch commutation. Conventional switch-mode converters using this type of soft-switch are known as Quasi-Resonant Converters.

ZCS may be attempted when an inductor is placed in series with the semiconductor switch FIG. 1. Since the energy stored in an inductor cannot change instantaneously, therefor neither can the current through it change instantaneously. If energy resonates between the inductor and the capacitor when the switch is on, then the switch may be opened losslessly (in theory) at a time when the inductor has dumped all of its energy to the capacitor. Once the switch is open, the inductor current remains zero, and the switch can turn on with zero-current through it.

ZVS may be attempted when a capacitor is placed in parallel with the semiconductor switch (FIGS. 2 and 3). Since energy stored in the capacitor cannot change instantaneously, therefor neither can the voltage across it change instantaneously. If energy resonates between the capacitor and the inductor when the switch is off, then the switch may be closed losslessly (in theory) at a time when the capacitor has dumped all of its energy to the inductor. Once the switch is closed, the capacitor is shorted and its voltage remains zero, thus allowing zero-voltage-turn-off for the switch.

Both ZVS and ZCS conventional techniques seek to decrease switching losses and attempt to permit high efficiency operation at higher switching frequencies. However, only ZVS is effective in reducing switching losses at high frequencies. The reason for this is that some loss must take place during turn-on of a ZCS switch. Parasitic capacitance across the semiconductor switch stores energy while the switch is off, and releases stored energy internally when the switch is turned on. For this reason, high frequency operation of such conventional converters, even with the attendant switching losses, is possible only with ZVS converters.

In practice, ZCS techniques have often been used in place of ZVS techniques even though switching losses are not altogether eliminated (e.g. ZCS Boost QRC of FIG. 7). With ZVS converters, the large resonant voltage of the resonant capacitor is imposed across the active switch. In some half and full-bridge converter topologies, this resonant voltage is limited by the clamping action of the input voltage source. In single-ended converter topologies, such as the ZVS Boost QRC of FIG. 8, the voltage is unrestrained and may peak at a value equal to ten times or more the input or output voltage. This peak resonant voltage is also a strong function of the output load resistance or current. Therefor at high voltage and/or high power levels, the voltage stresses impressed upon the active switch are intolerable, thus making ZVS implementation in known single-ended converters impractical.

Several techniques have attempted to reduce these high voltage levels in the hopes of making ZVS a viable technique for high voltage and/or high power applications. One such technique known as ZV Multi-Resonant Switching (ZVS-MR) reduces voltage stresses by adding a second resonant capacitor across the rectifying diode(s) of the power converter as shown in U.S. Pat. Nos. 4,860,184; 4,841,220 and 4,857,822. Two resonant capacitors —one across the active switch(es), and the other across the rectifier diode(s)—share the energy resonating from the resonant inductor. In this way, the peak voltage across the active switch is reduced since the high voltage is divided between the two resonant capacitors. A typical ZVS-MR Boost Converter is shown in FIG. 9. Unfortunately, this technique does not solve the problem, particularly so for off-line applications where input voltages may be as high as several hundred volts.

Another technique incorporating the above mentioned multi-resonant technique has also attempted to decrease voltage stresses on the active switch. This technique uses the above mentioned two capacitor multi-resonant circuit, but includes a voltage clamping mechanism for limiting the active switch voltage. This technique implemented in a Boost converter is shown in FIG. 10. The voltage clamping circuit includes a bulk capacitor and an auxiliary switch. Since this bulk capacitor is large in value relative to the resonant capacitors, the voltage across it may be designed to be approximately constant over a switching cycle. When the voltage on the active switch is equal to that of the bulk capacitor, the auxiliary switch turns on with ZVS and energy flowing from the resonant inductor is routed from the resonant capacitor to the bulk capacitor. The auxiliary switch turns back off once the amount of charge which flowed into the bulk capacitor has flowed back out. In this way no net charge accumulates on the bulk capacitor from one cycle to the next and its voltage remains essentially constant. This technique lowers peak voltage stresses, but circuit complexity is increased, and reliability has decreased since failure of the active voltage clamping circuit causes voltage breakdown in the main active switch and consequent failure of the power supply.

One type of converter which has successfully produced lower voltage stress for all active and passive semiconductor devices is known as the Quasi-Square Wave Converter. This converter modifies the switch-mode single-ended converters by placing a resonant capacitor across the active switch and/or the passive switch (diode), while the filtering inductor is replaced by a small resonant inductor. A diode is added in parallel with the active switch, and an second active switch is sometimes added across the rectifying diode (FIG. 11 ). In doing so, all semiconductor switches operate with ZVS, and their peak voltage is passively limited (by the diodes in the circuit) to whatever voltage sources and sinks are present in the circuit.

For example, in a Boost converter, the input filter inductor is replaced by a resonant inductor, and the voltage stress on the switches is equal to the output voltage. Unfortunately, rms currents in the resonant inductor are high, and continuous conduction of the resonant inductor current is impossible. In effect, the QSW Boost converter is no longer driven by an effective current source, but rather a voltage source. A further disadvantage of such a converter is that converter voltage gain is severely limited. For instance, a variable frequency controlled Boost QSW converter has a minimum gain of 2.

In a quasi-square wave boost converter, the voltage stress of the active switch and passive switch is limited to the output voltage since these switches along with the output filter capacitor form a closed loop. In other words, the sum of the two switch voltages equals the output voltage. The two diodes in the circuit will passively turn-on when the voltage on either switch reaches the output voltage. To conserve the original operation of the Boost converter, the input inductor must be restored to a filter inductor (so that input current may be continuous and nearly constant if desired,) and the resonant inductor must be moved to a new location in the circuit.

For ZVS operation of the switches, the resonant inductor is needed to remove the charge stored within the parasitic capacitances of each switch. By adding an auxiliary switch and diode, the zero-voltage-transition (ZVT) converter circuit of FIG. 12 is shown. This converter achieves ZVS operation for the main power switch S and power rectifier $D_R$, however the auxiliary switch and diode operate with ZCS. Although the power flow is not directed through these devices, losses are nevertheless unacceptable at higher switching frequencies since the voltage across these devices may be as high as 400 Volts in universal input off-line applications. This lossy switching results in the inability to operate at very high frequencies.

Therefor, single-ended switching power converters possessing exclusively ZVS operated semiconductor devices along with low voltage stresses have not been forthcoming. A ZVS-MR converter with an auxiliary active voltage clamping mechanism is not reliable since the clamping is not passive but active, and added complexity is also required to control the auxiliary clamping switch. Quasi-square wave converters possess an inherent passive voltage clamping mechanism, however the basic operation of these converters have been altered from that of their switch-mode counterparts. Input or output filter inductors have been replaced by small resonant inductors causing high rms discontinuous currents. By relocating the resonant inductor and adding an auxiliary active switch and diode, the ZVT converter provides desired ZVS switching for the power switch and power rectifier, but operates the auxiliary active switch and diode with ZCS to yield unacceptable turn-on losses at high frequencies.

Detailed Description of the Preferred Embodiment

A novel ZVS single-ended converter configuration is provided which eliminates high voltage stresses inherent in most ZVS circuits. The present invention incorporates a mechanism for passively limiting all switch voltages to whatever voltage sources are present in the converter. For example, in a Boost converter the switch voltages would be passively limited to the output voltage $V_O$. As will be described, the voltage limiting mechanism is maintained even when driving gate signals fail, thus yielding a reliable voltage clamping mechanism. In addition, the driving waveforms for the main and auxiliary switch may be essentially complementary, thus requiring a simple driving circuit. The invention is controlled by varying the switching frequency of the switches while maintaining a constant duty cycle for each switch. Variations of this variable frequency control scheme are possible and will be discussed.

Figure 15:
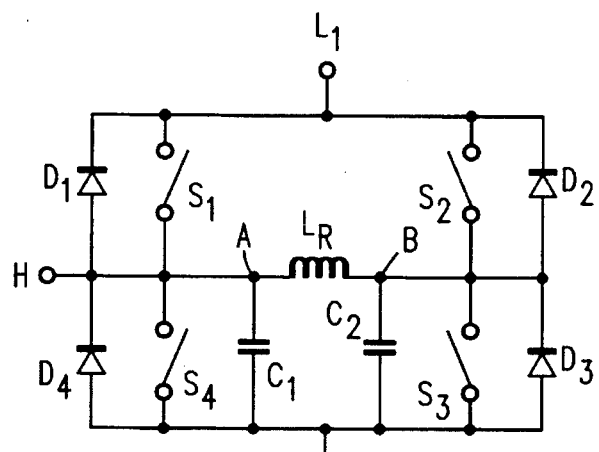
FIG. 15 is a generalized schematic of a Resonant Switching Bridge.

The novel converter includes a full-bridge resonant switching circuit comprised of four diodes D1–D4 and two active switches S3, S4 as shown in FIG. 15. If MOSFET's are used, the body diode of each MOSFET may serve as one of the four required diodes. A resonant inductor $L_R$ is connected across the bridge between nodes a and b, and parasitic capacitance of the diodes and active switches are included in the equivalent capacitances $C_1$ and $C_2$. Connected in parallel with the bridge is a voltage source or sink (not shown), depending on the direction that power will flow. Connected to node a is a current source or sink (not shown), dependent upon the direction of power flow.

Several preferred embodiments of this resonant switching bridge will now be described. One embodiment includes of two active switches $S_3$ and $S_4$. However, a third active switch $S_2$ may be desirable when low voltage gain is desired.

The present invention stores sufficient energy in the resonant inductor ($L_R$) so that prior to each switch or diode commutation, charge present on each semiconductor parasitic capacitance may be removed by the current drawing action of the inductor $L_R$. In this way all diodes and active switches operate with true ZVS. This bridge configuration of the invention accomplishes at least three tasks: to direct the power flow from the source to the load, to passively guarantee voltage limitation across each diode and switch, and to provide volts-seconds balance for the resonant inductor $L_R$.

Figure 16:
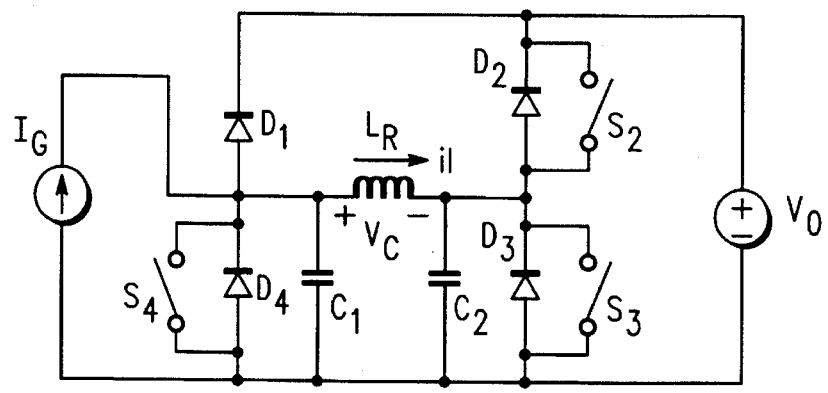
FIG. 16 is a simplified schematic of the converters shown in FIGS. 13–14.
Figure 17:
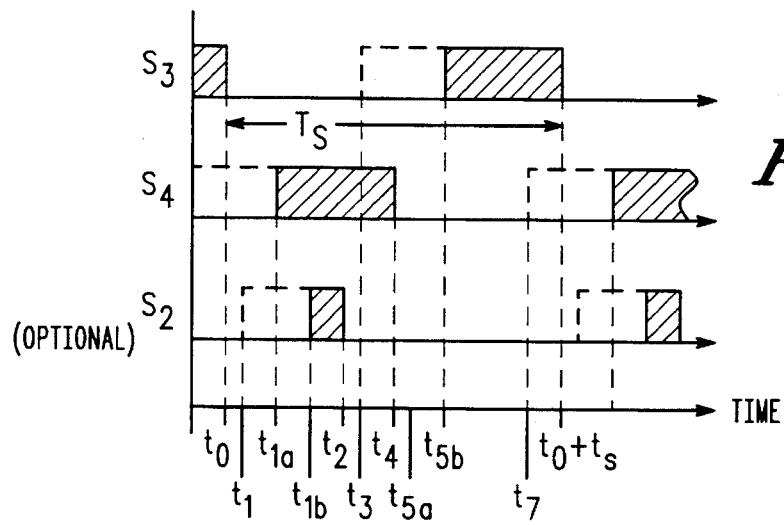
FIG. 17 show typical switching waveforms of the Boost converters of FIGS. 13–14.
Figure 23:
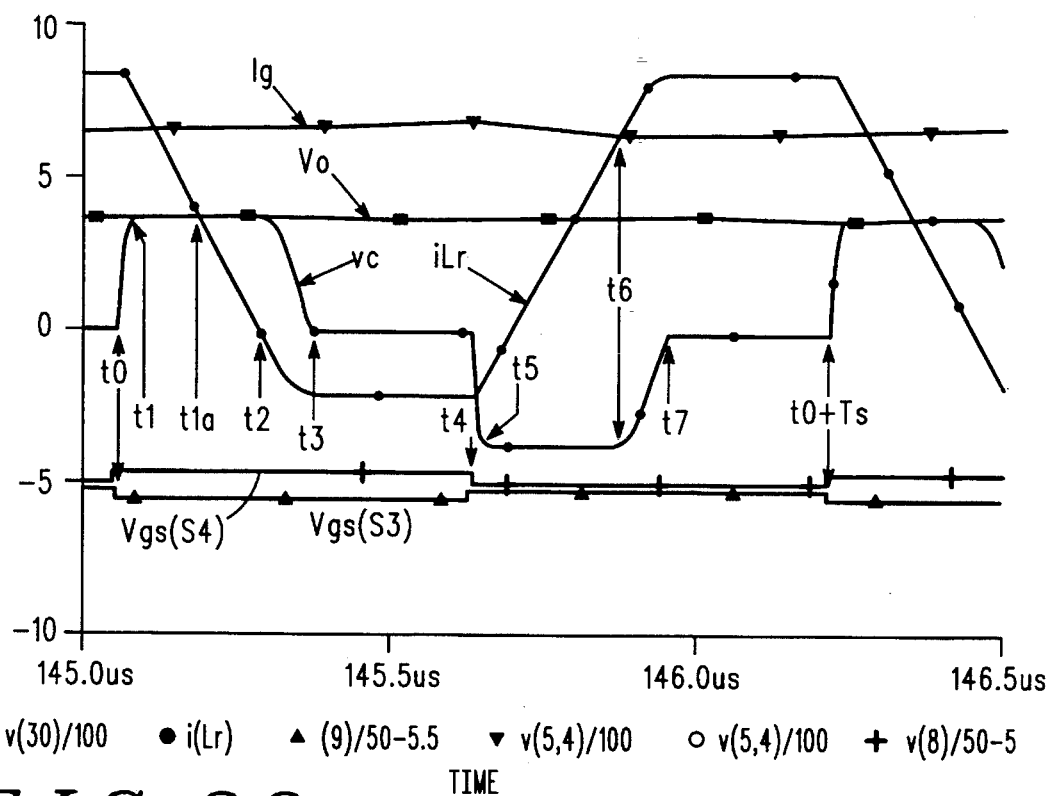
FIG. 23 shows simulated waveforms of the Boost converter of FIG. 13.
Figure 24:
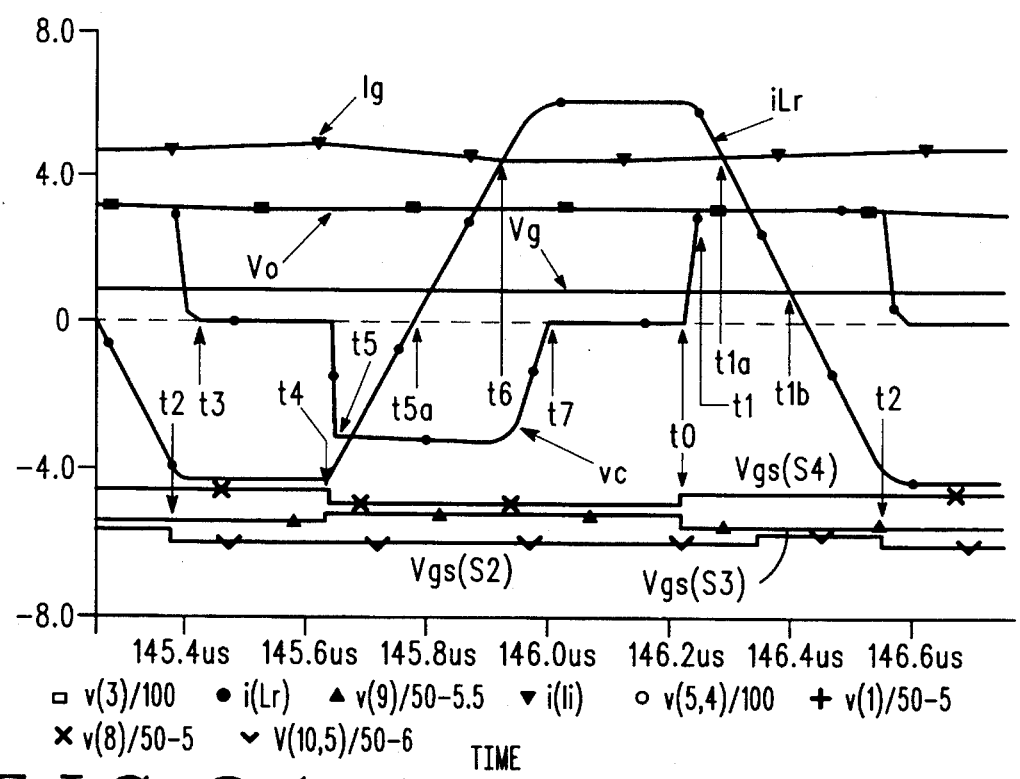
FIG. 24 shows simulated waveforms of the Boost converter of FIG. 14.

Exemplary operation will be described for the Boost converter, but these principles may be applied to a large number of switching converters. FIG. 16 shows the simplified schematic of a Boost converter with the novel resonant bridge switch configuration. FIG. 17 shows the switch driving waveforms, and FIGS. 18–22 show the topological circuit modes of the converter. Converter operation may be better understood in light of the circuit waveforms of FIGS. 23 and 24. It is noted that in this exemplary embodiment of the invention, lumped capacitances $C_1$ and $C_2$ are set to be equal, thus allowing their replacement in FIG. 15 with an equivalent capacitance $C_r=C_1=C_2$ (not shown). The voltage across this equivalent capacitance is defined as $v_c$, and the current flowing through the resonant inductor is defined as $i_r$. With $C_1=C_2$, the converter operation and analysis may be more simply presented.

Figure 25:
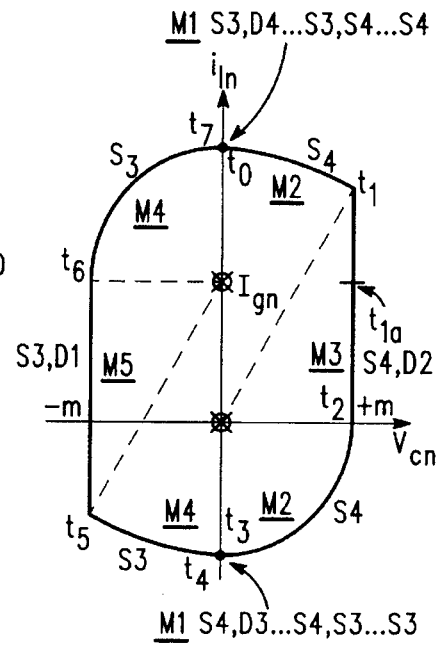
FIGS. 25 shows the state-plane diagram for the Boost converter of FIG. 13.
Figure 28:
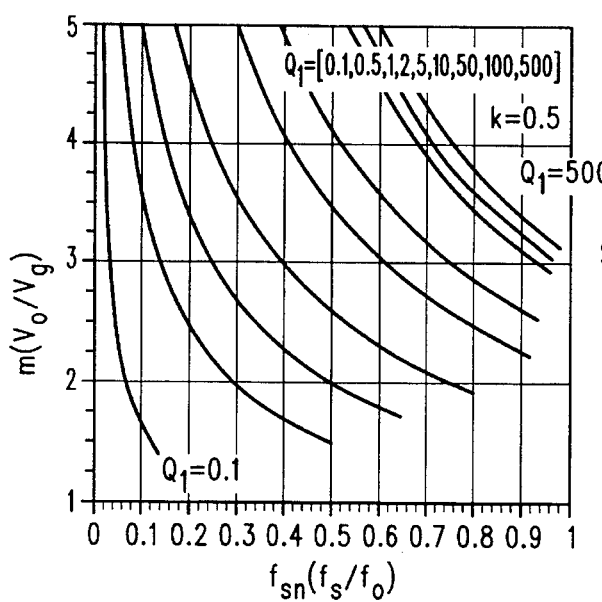
FIGS. 28–31 show the converter voltage gain curves of the three-quarters active Boost converter of FIG. 14 for various values of k.
Figure 26:
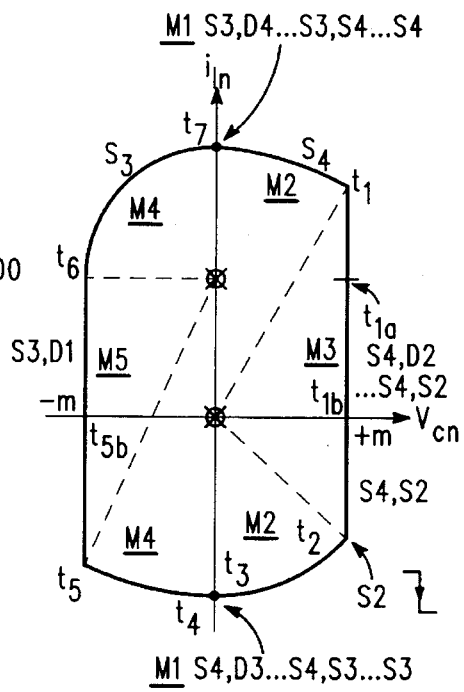
FIGS. 26 shows the state-plane diagram for the Boost converter of FIG. 14.
Figure 29:
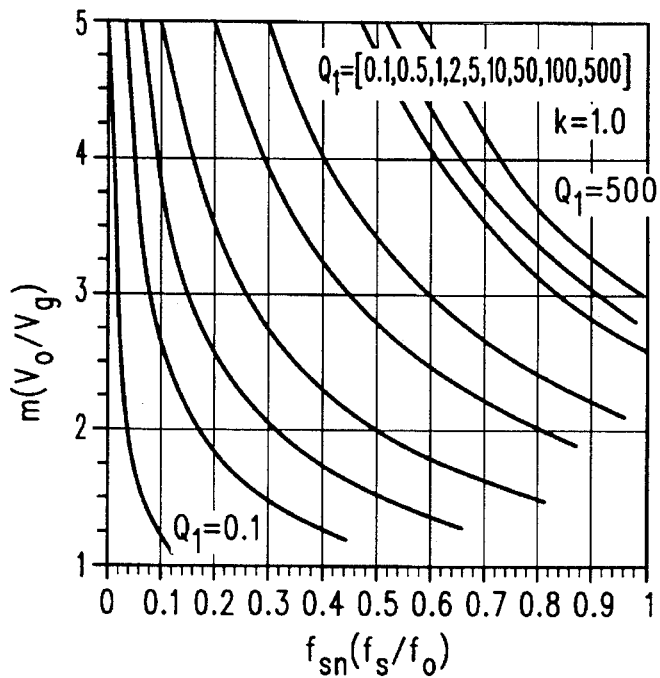
Figure 30:
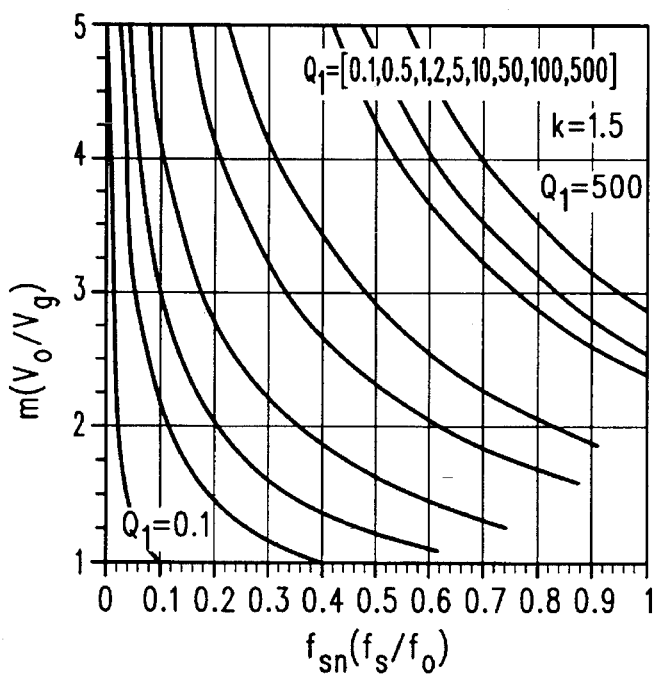
Figure 31:
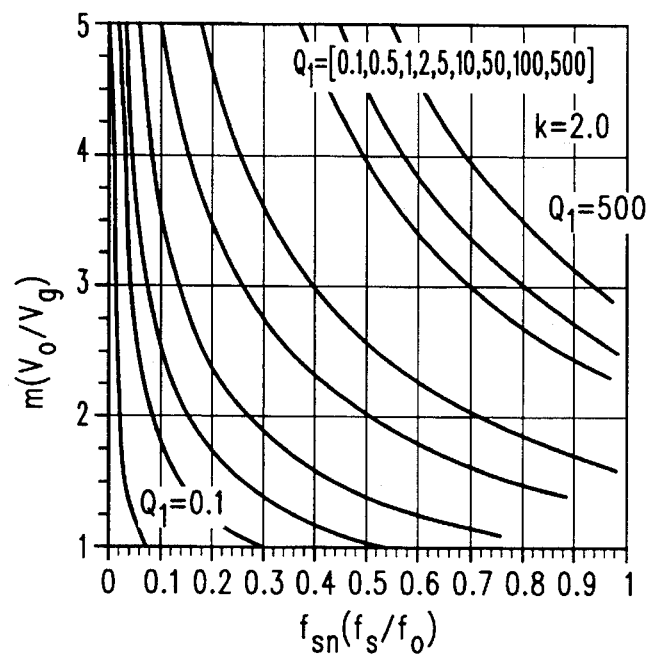

The state-plane trajectory of FIGS. 25 and 26 are also useful in understanding the principle of operation. To plot these trajectory currents, voltages, impedances, and times have been normalized as follows:

$$Z_o = \sqrt{L_r/C_r}$$

$$\omega_o = \frac{1}{\sqrt{L_r C_r}}$$

$Z_O$ is the circuit characteristic impedance, and $\omega_O$ is the natural angular frequency. The various normalized quantities may be distinguished by the subscript n. In general, normalized current will be defined as:

$$i_n \doteq i \frac{Z_o}{V_g}$$

Normalized times (referred to also as equivalent conduction angles,) are denoted by $\alpha_{if}$, $\beta_{if}$, and $\delta_{if}$, where the subscripts i and f refer to the initial and final times $t_i$ and $t_f$ of the time quantity being normalized. The normalization is shown for $\alpha$'s only, but is defined identically for $\beta$'s and $\delta$'s.

$$\alpha_{if} \doteq \omega_o(T_f - T_i)$$

The load impedance has also been normalized using the characteristic impedance defined above:

$$Q \doteq R_o/Z_o$$

Finally, the switching frequency of the converter has been normalized using the natural resonant frequency of the L-C tank circuit:

$$f_{sn} \doteq f_s \frac{2\pi}{\omega_o}$$

Prior to time $t_O$, switch $S_3$ is on, and a current greater than the input current $I_g$ circulates through the resonant inductor $L_R$ and switch $S_3$. The portion of inductor current in excess of $I_g$ flows through diode $D_4$. Switch $S_4$ may be turned on with ZVS during this time.

Figure 19:
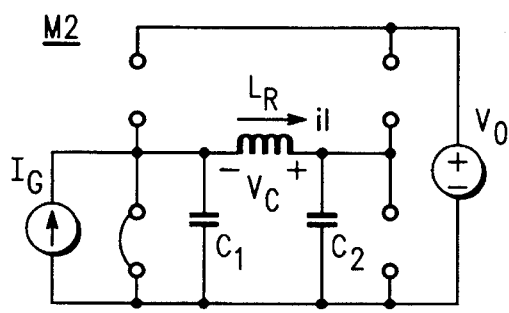

At $t=t_O$, switch $S_3$ turns off and the inductor current flows into resonant capacitor $C_2$. Resonant inductor $L_r$ and resonant capacitor $C_2$ resonant together until voltage $v_{C2}$ equals the output voltage $V_O$. This is circuit mode M2 (FIG. 19).

Figure 20:
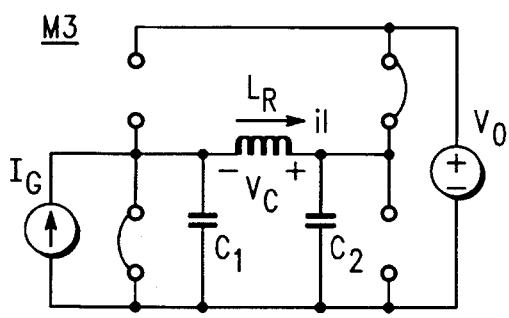

At $t=t_1$, diode $D_2$ begins to conduct, producing along with diode $D_4$, a constant di/dt across the resonant inductor $L_r$. The current in resonant inductor $L_r$ decreases linearly until it reaches zero. If the resonant switching bridge is implemented with three active switches, then active switch $S_2$ may be turned on any time after $t_1$. When the resonant inductor current has reached zero (defined as $t=t_{1b}$) diode $D_2$ turns off. Therefor if active switch $S_2$ is present, it must be turned on prior to $t_{1b}$. This window of time over switch $S_2$ may be turned on is depicted by the dotted area in the switching waveforms of FIG. 17. This is circuit mode M3 (FIG. 20).

At $t=t_2$, switch $S_2$ or diode $D_2$ turn off causing inductor $L_r$ and capacitor $C_2$ to resonant together once again. If active switch $S_2$ is not present, then time $t_2$ coincides with time $t_{1b}$, and the resonant inductor current will be zero at this time. With the use of active switch $S_2$, the resonant inductor current will be negative when $S_2$ turns off. This is circuit mode M2 (FIG. 19).

Figure 18:
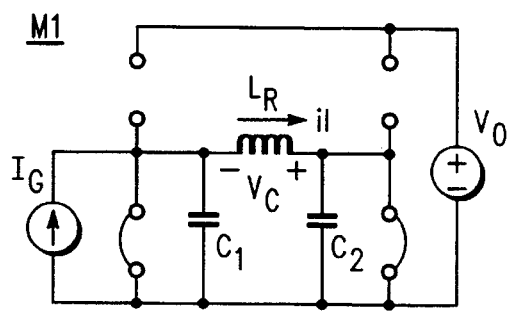
FIGS. 18–22 show topological circuit modes of the Boost converters of FIGS. 13–14.

At $t=t_3$, capacitor voltage $v_{C2}$ reaches zero, and diode $D_3$ begins carrying the current flowing through resonant inductor $L_r$. The converter remains in this mode until switch $S_4$ is turned off. During this time, switch $S_3$ may be turned on with ZVS. This is circuit mode M1 (FIG. 18).

Figure 21:
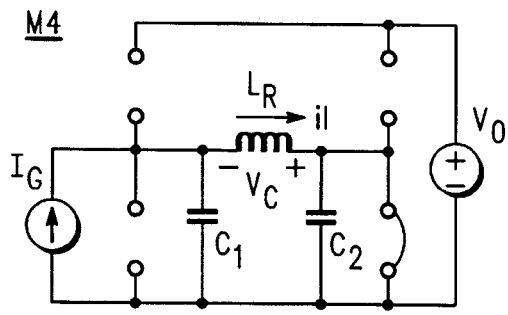

At $t=t_4$, switch $S_4$ is turned off, and the current through resonant inductor $L_r$ flows into resonant capacitor $V_1$. The two components ($L_r$ and $C_1$) resonate together until voltage $v_{C1}$ across resonant capacitor $C_1$ reaches the output voltage $V_O$. This is circuit mode M4 (FIG. 21).

Figure 1:
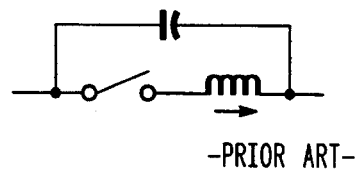
FIGS. 1–3 are schematic diagrams of a prior art Zero Current Switch (ZCS)
Figure 4:
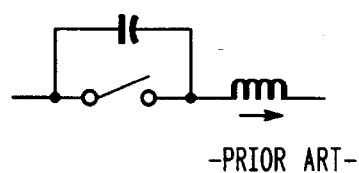
FIGS. 4–6 are schematic diagrams of a prior art Zero Voltage Switch (ZVS).
Figure 2:
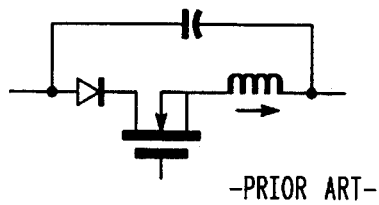
Figure 5:
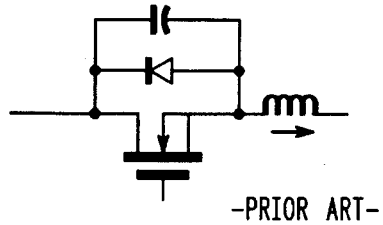
Figure 3:
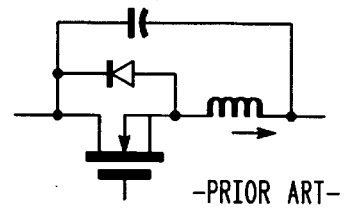
Figure 6:
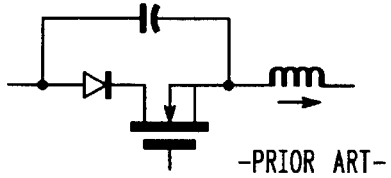
Figure 7:
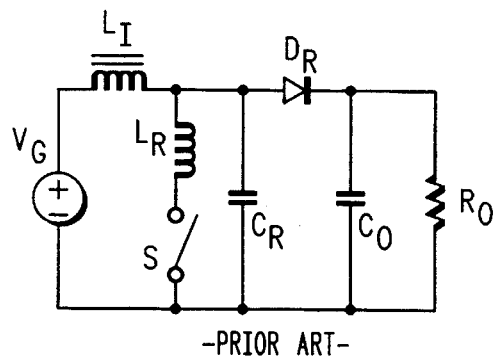
FIG. 7 is a schematic diagram of a prior art ZCS Boost Quasi-Resonant Converter (QRC).
Figure 8:
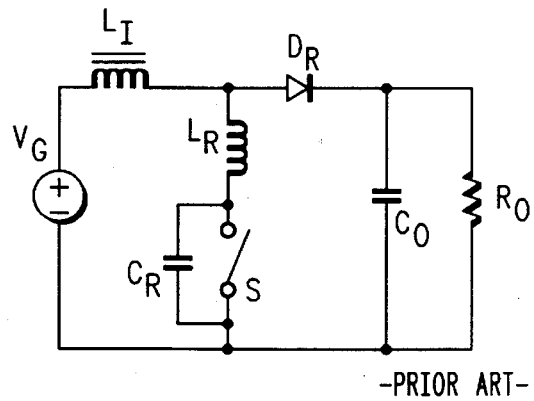
FIG. 8 is a schematic diagram of a prior art ZVS Boost QRC.
Figure 9:
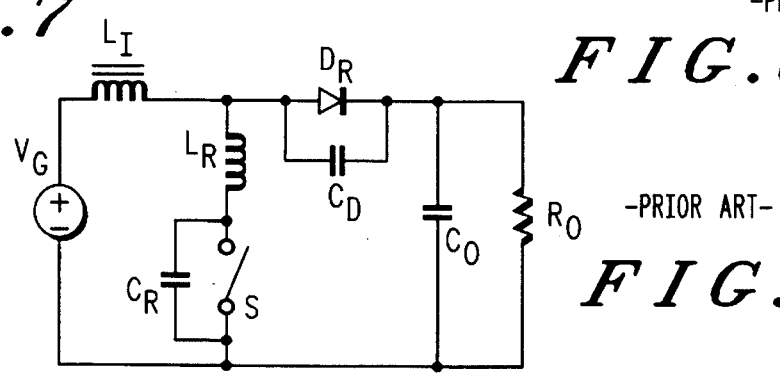
FIG. 9 is a schematic diagram of a prior art ZVS Boost Multi-Resonant Converter (MRC).
Figure 10:
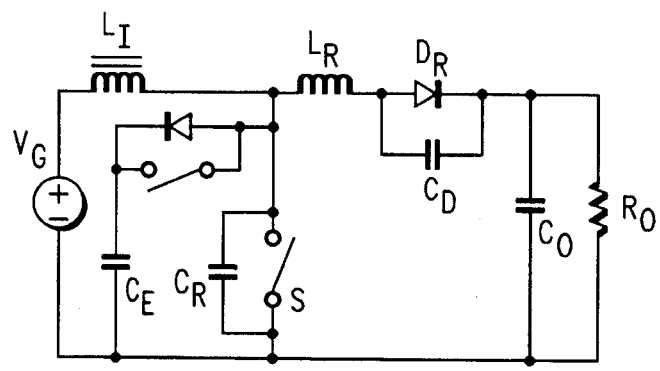
FIG. 10 is a schematic diagram of a prior art ZVS Boost MRC with voltage clamping.
Figure 11:
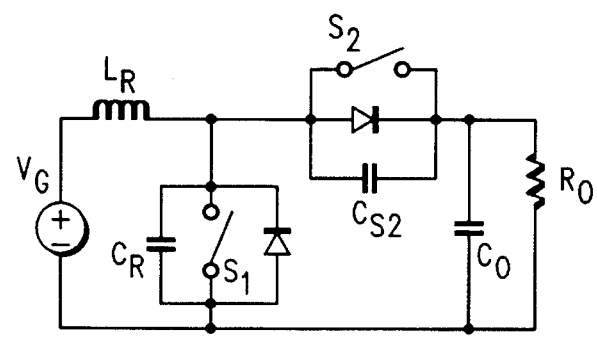
FIG. 11 is a schematic diagram of a prior art ZVS Boost Quasi-Square Wave Converter (QSWC).
Figure 12:
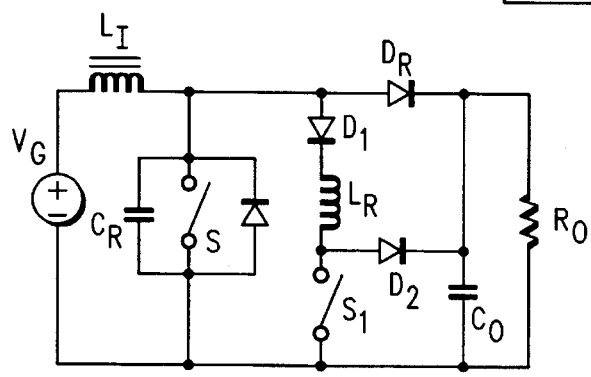
FIG. 12 is a schematic diagram of a prior art ZVT Boost converter with auxiliary ZCS switch.
Figure 22:
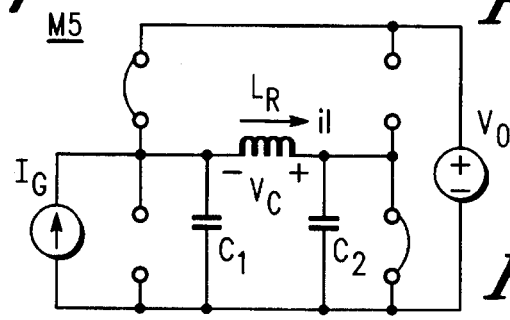

At $t=t_5$, diode $D_1$ begins to conduct producing along with diode $D_3$ a constant di/dt across the resonant inductor $L_r$. The current in resonant inductor $L_r$ increases linearly until it reaches the input current $l_g$. We define the time $t=t_{5a}$ to be when the current through resonant inductor $L_r$ is zero and changing from a negative to a positive value. At this time the current through diode $D_3$ has decreased to zero, so active switch $S_3$ must be turned on prior to this time. This window of time over which $S_3$ must be turned on is depicted by the dotted area in the switching waveforms of FIG. 12. This is circuit mode M5 (FIG. 22).

At $t=t_6$, the current in resonant inductor $L_r$ has reached $I_g$, and diode $D_1$ turns off causing inductor $L_r$ and capacitor $C_1$ to resonant together once again. This is circuit mode M4 (FIG. 21).

At $t=t_7$, capacitor voltage $v_{C1}$ reaches zero, and diode $D_4$ begins carrying the current flowing through resonant inductor $L_r$. During this time switch $S_4$ may be turned on with ZVS. The converter remains in this mode until switch $S_3$ is turned off and a new switching cycle is initiated. Switch $S_4$ must be turned on prior to time $T_s+t_{1b}$. This window of time over which $S_4$ must be turned on is depicted by the dotted area in the switching waveforms of FIG. 12. This is circuit mode M1 (FIG. 18).

Figure 27:
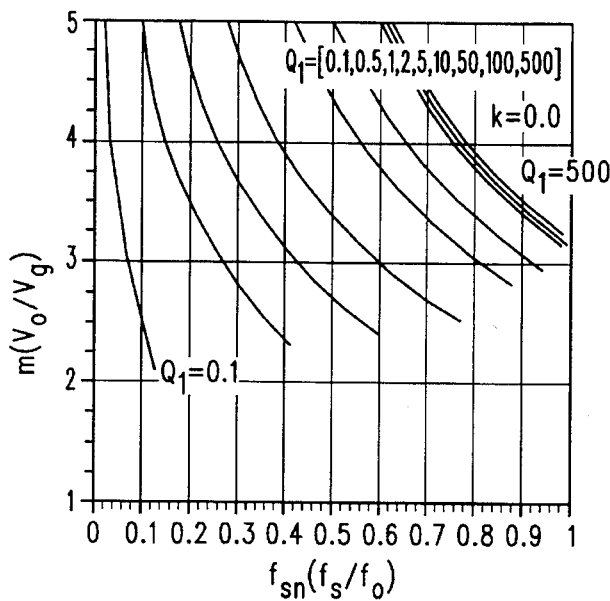
FIG. 27 shows the converter voltage gain curves of the half-active Boost converter of FIG. 13.

By performing the steady-state analysis of this novel Boost converter based upon the state-plane diagram of FIGS. 25 and 26, converter voltage gain curves may be generated which plot $V_o/V_g$ versus the normalized switching frequency $f_{sn}$ for various values of normalized load $Q_l$. FIG. 27 shows these curves when only two active switches ($S_3$ and $S_4$) are implemented. It is noted that the voltage gain is always greater than 2, and only for very small values of $Q_l$ does the gain approach 2. With the addition of a third active switch $S_2$ the minimum attainable gain is decreased. We define a parameter k where $$k = \frac{-i_{ln}(t_2)}{I_{gn}}$$

If only active switches $S_3$ and $S_4$ exist, then k=0 since $i_{ln}(t_2)=0$. However, with the addition of $S_2$, $i_{ln}(t_2)$ will be determined by the control circuit when $S_2$ turns off. Therefor, for example, if k=1 is set to equal 1, then $S_2$ will be turned off when $i_{ln}(t_2)=-I_{gn}$. Converter gain curves are shown in FIG. 28–31 for values of k={0.5,1.0,1.5,2.0}. It is clear that the minimum attainable voltage gain is decreased.

Although the operation described above relates to the Boost converter, the present invention may be extended to a number of other novel converters. The novel resonant switching bridge of FIG. 15 possesses three terminals denoted as $L_0$, $L_1$, and H. In general, these three terminals will be connected to either high or low impedance elements (not shown). Typically, a switching power converter will usually possess inductive and capacitive filter elements in addition to the switching semiconductors. These elements are used to filter out AC harmonics generated within or without the DC to DC converter. If these filter elements are assumed very large, such that the voltage on a filtering capacitor and the current through a filtering inductor is approximately constant, then these elements may be referred to as energy buffers. In other words, the elements do not source or sink any average power, but since energy is stored therein, the elements may source or sink instantaneous power.

If an inductor energy buffer is placed in series with a voltage source, then the voltage source may provide average power to the circuit in the form of an essentially constant current source. The impedance looking into this current source is high since the inductor is in series with the voltage source. In general, voltage sources and capacitor energy buffers may be considered as low impedance elements since they cannot directly affect the current flowing through them. Similarly, current sources and inductor energy buffers may be considered as high impedance elements since they cannot directly affect the voltage across them.

Referring now to the novel Boost converter of FIG. 16, note that a current source $l_g$ feeds into node H of the resonant switching bridge cell. A capacitor energy buffer $C_O$ is positioned between nodes $L_0$ and $L_1$ of the resonant switching bridge cell. Therefor, the impedance between nodes H and $L_0$, as well as between H and $L_1$ is high. However, the impedance between nodes $L_0$ and $L_1$ is low. Although shown here for the Boost converter, this will be true for all novel converter implementations using the resonant switching bridge cell according to the present invention. Although we have assumed that these filtering inductors and capacitors are very large in value such that the energy stored in them does not change over a switching cycle, in general the principles of operation using the novel resonant switching bridge cell are valid even when this assumption is not satisfied. For example, the operation of a Boost converter was presented for a continuous conduction mode of operation, however an input inductor could be designed for discontinuous conduction mode as well, and ZVS operation of the novel resonant switching bridge cell would still be feasible.

Figure 32:
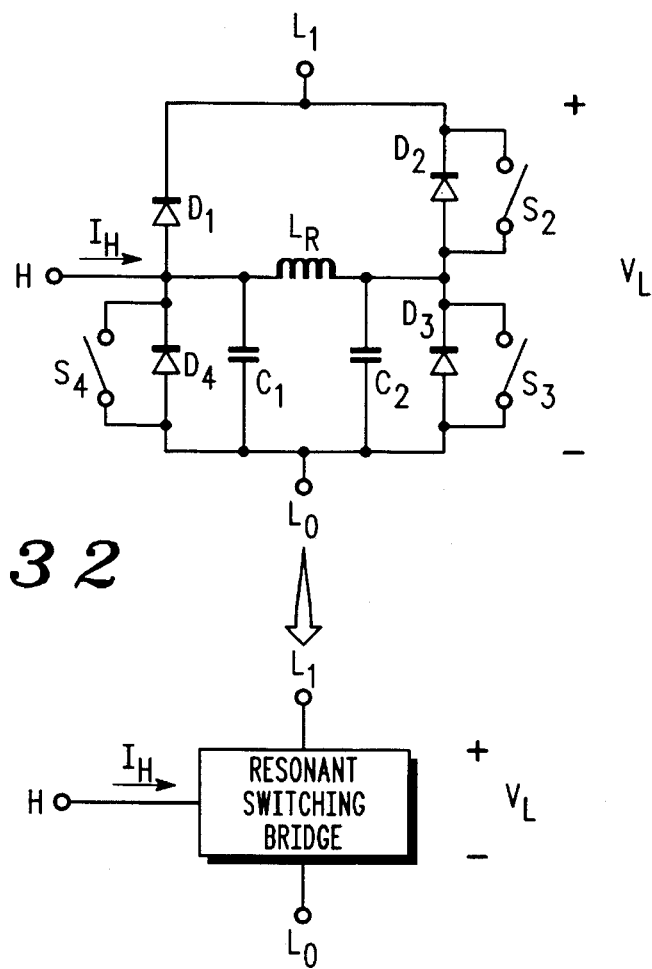
FIG. 32 is a block representation of a Resonant Switching Bridge.
Figure 33:
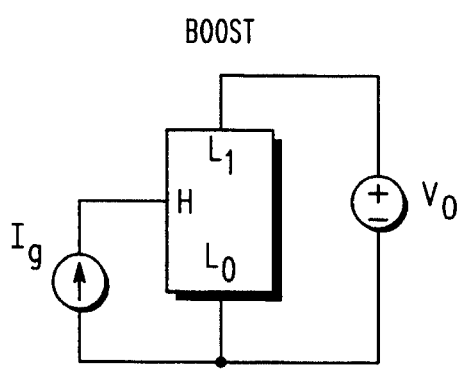
FIGS. 33–38 show topologies of a Resonant Switching Bridge in various single-ended modes.
Figure 34:
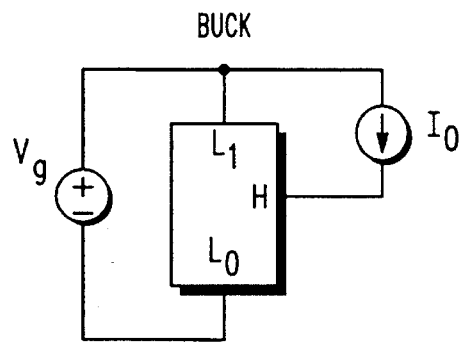
Figure 35:
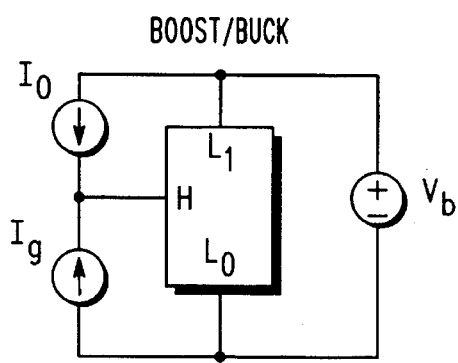
Figure 36:
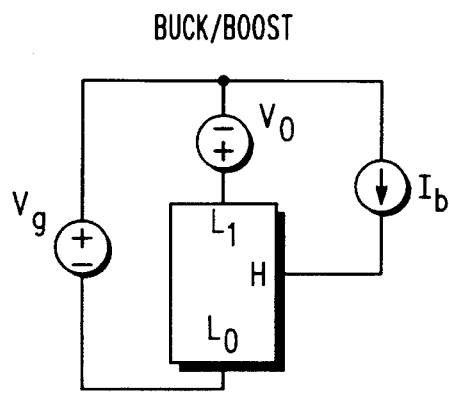
Figure 37:
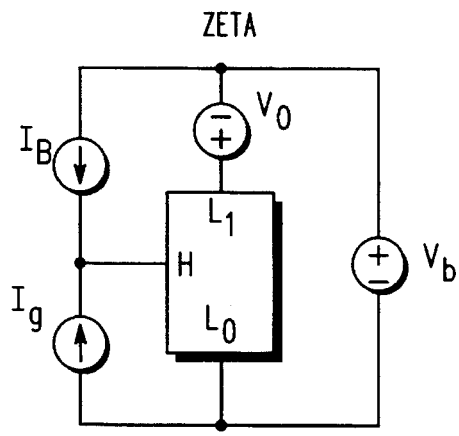
Figure 38:
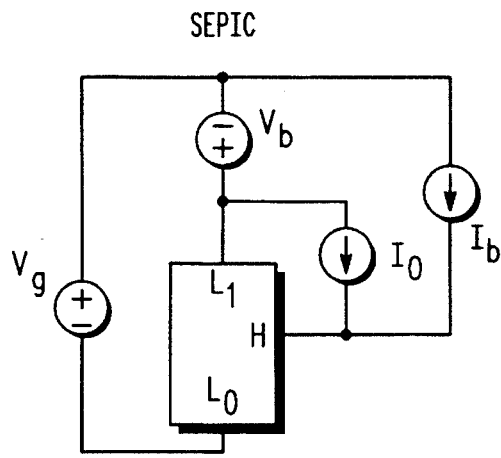
Figure 39:
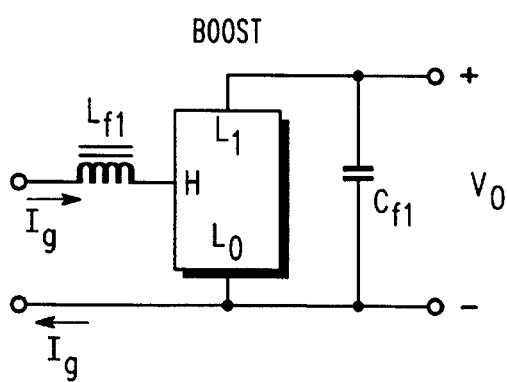
FIGS. 39–44 show alternative topologies of the converters shown in FIGS. 33–38, respectively.
Figure 42:
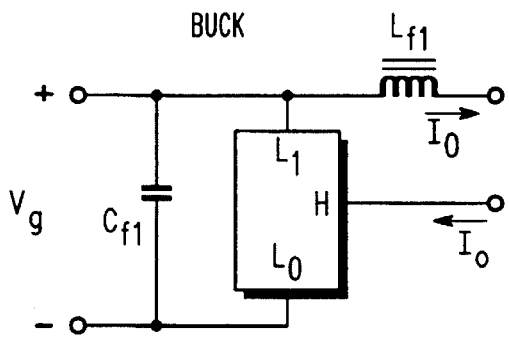
Figure 40:
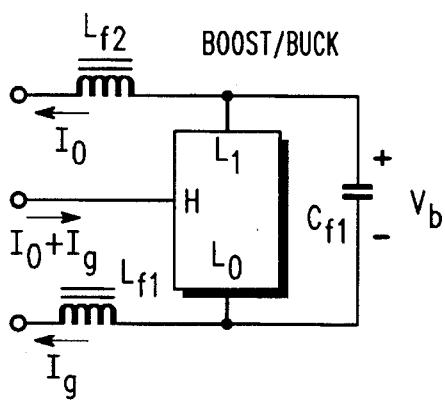
Figure 43:
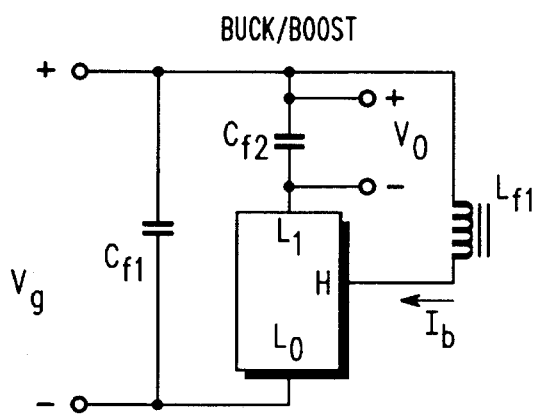
Figure 41:
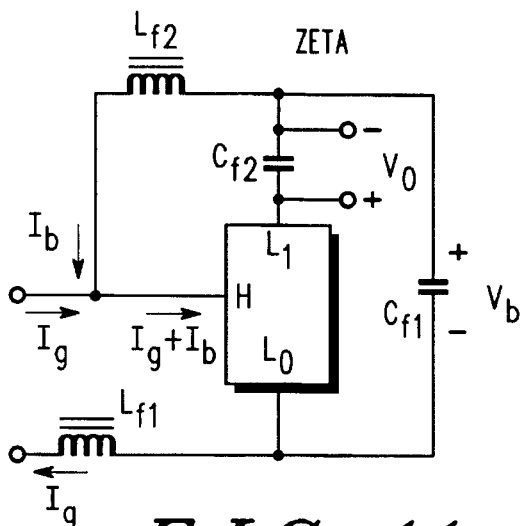
Figure 44:
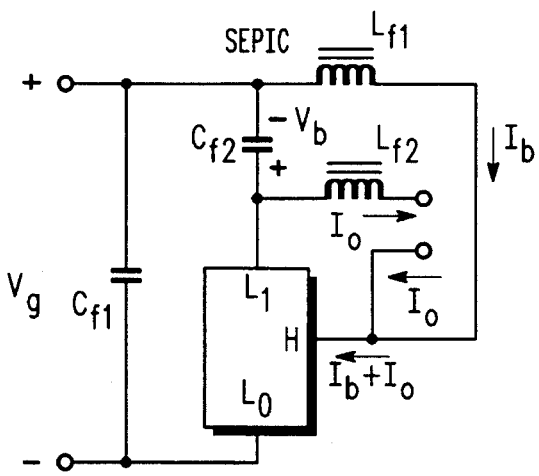

The novel resonant switching bridge cell is represented as a three terminal device in FIG. 32. By configuring external filter inductors and capacitors appropriately, six basic single-ended switch-mode DC to DC converters may be implemented using the resonant switching bridge cell as shown in FIGS. 33–38. FIGS. 39–44 show practical implementation of the basic novel converters using filtering inductors and capacitors. It should be noted that only a minimal number of filtering elements has been added to satisfy the constraints of the resonant switching bridge cell of the invention. However, in practice, additional filtering elements can be added at the input and output of the converter of interest.

In each converter of FIGS. 33–38, a nearly constant current $l_H$ flows into node H of the resonant switching bridge cell, and a nearly constant voltage $V_L$ is present across nodes $L_0$ and $L_1$ (assuming continuous conduction mode.) Table I shows the values of $l_H$ and $V_L$ for each of the six converters of FIGS. 33–38. Output voltages and currents are denoted as $V_O$ and $l_O$ respectively, input voltages and currents are denoted as $V_g$ and $l_g$ respectively, and energy buffer voltages and currents are denoted as $V_b$ and $l_b$ respectively. Therefor, the operation of the Boost converter described above is identical to that of each of the converters of FIGS. 33–38, with the exception that the current $l_H$ would no longer equal $l_g$, and the voltage $V_L$ would no longer equal $V_O$. The values of those converters are as defined in Table I.

TABLE I

| Converter | $V_L$ | $I_H$ |
|---|---|---|
| Buck | $V_g$ | $I_o$ |
| Boost | $V_o$ | $I_g$ |
| Buck/Boost | $V_g + V_o$ | $I_b$ |
| Boost/Buck(Cuk) | $V_b$ | $I_g + I_o$ |
| SEPIC | $V_g + V_b$ | $I_b + I_o$ |
| Zeta | $V_o + V_b$ | $I_b + I_g$ |

Figure 45:
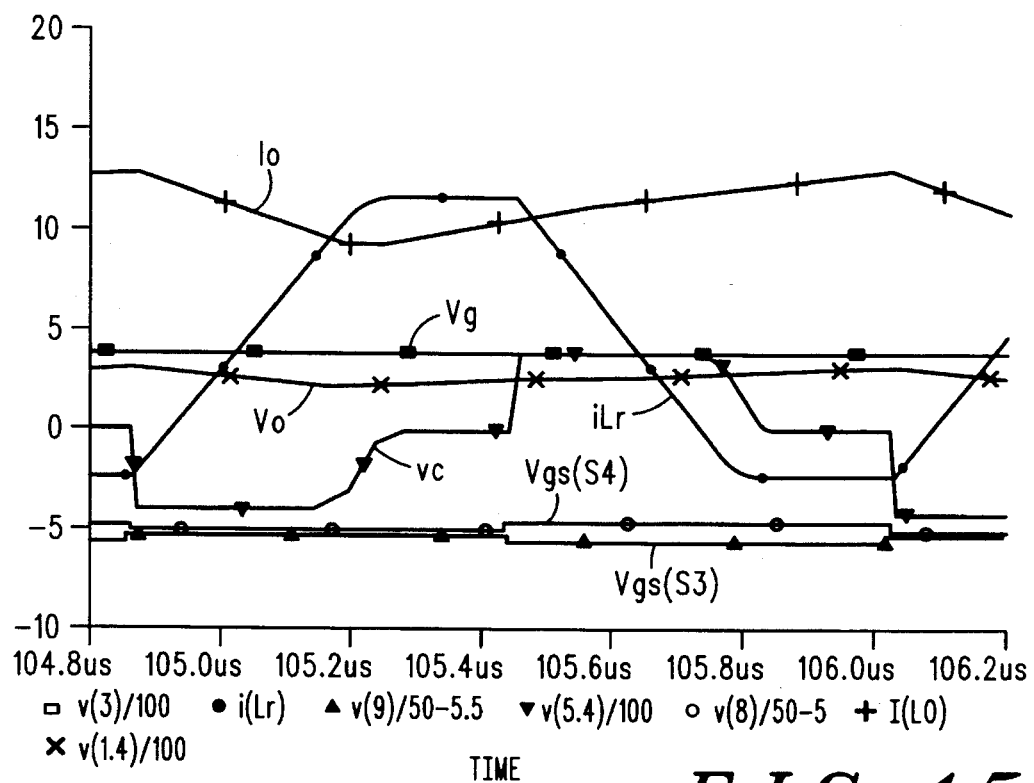
FIG. 45 shows simulated waveforms for the Buck converter of FIG. 39 in a half-active configuration.
Figure 46:
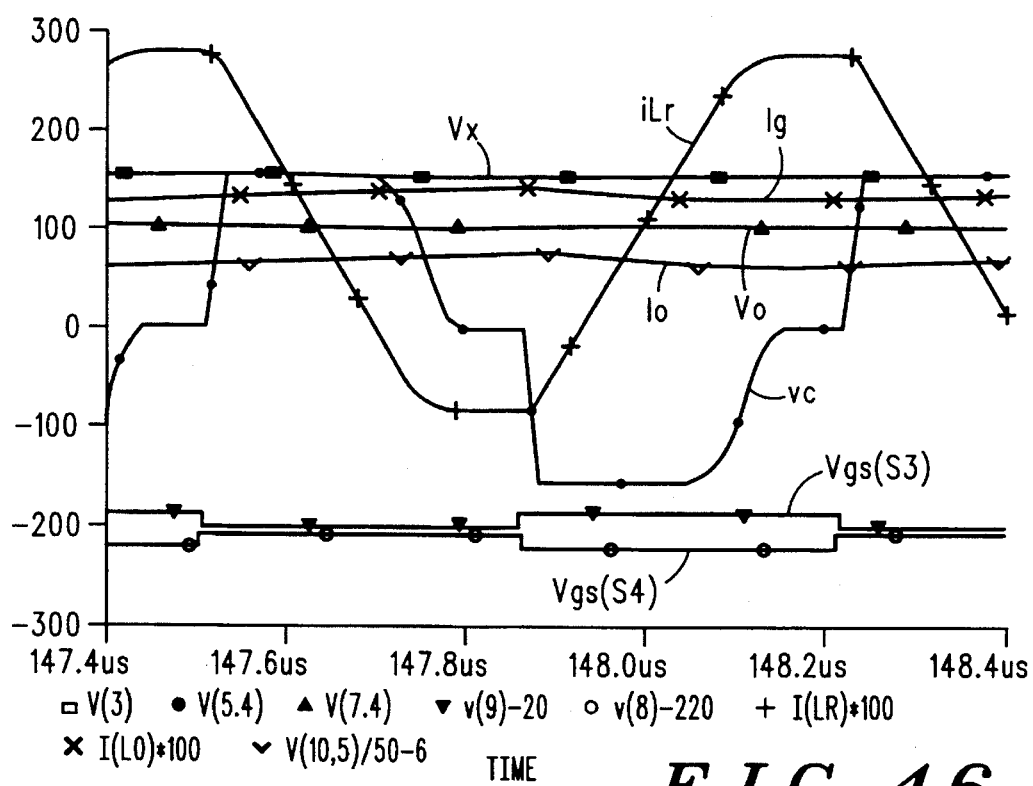
FIG. 46 show simulated waveforms for the Cuk converter of FIG. 40 in a half-active configuration.

To demonstrate the validity of Table I, a Buck converter and Cuk converter were simulated using the resonant switching bridge. Typical waveforms are shown in FIGS. 45 and 46.

Figure 13:
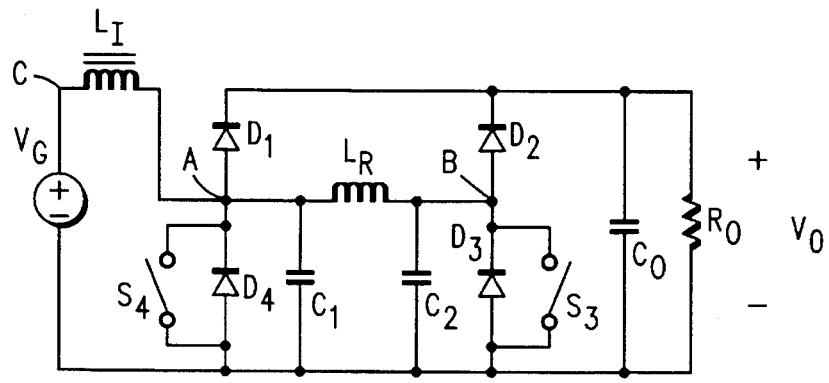
FIGS. 13 and 14 depict the present invention as a Variable Frequency Boost With Resonant Bridge Switch in half-active and three-quarter active configurations, respectively
Figure 14:
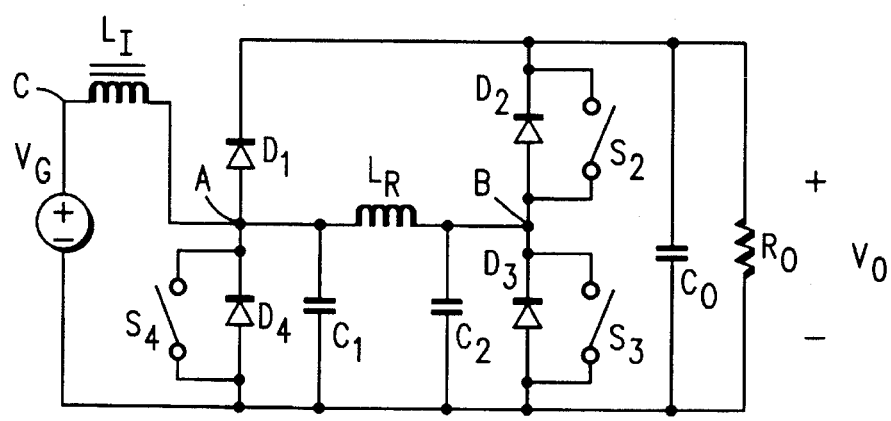
Figure 47:
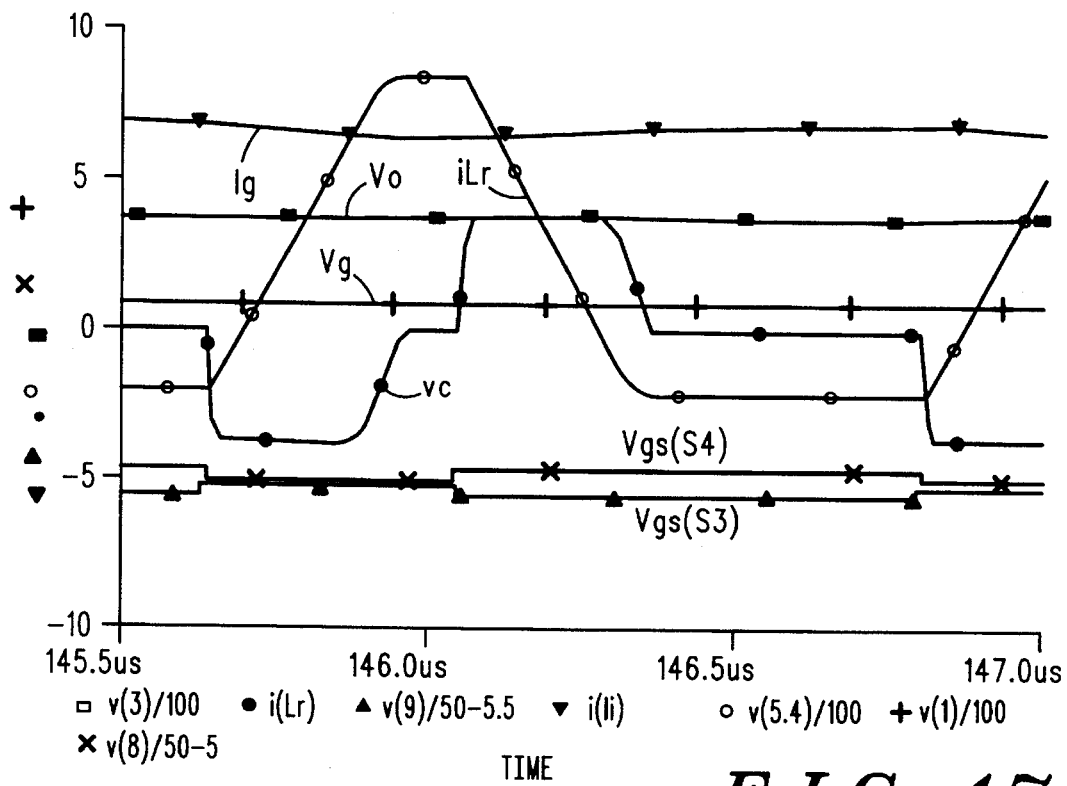
FIG. 47 show simulated waveforms for the Boost converter of FIG. 13 with asymmetrical driving signals.

Several variations of the above described embodiments should be noted. In the exemplary switching waveforms of FIG. 17, switches $S_3$ and $S_4$ appear to switch at nearly 50% duty cycle such that their respective on-times are essentially equal. However, similar performance will be achieved if these switches do not share equivalent on-times. For instance, the on-time of $S_3$ may be decreased or increased by spending less or more time in circuit mode M1 (refer to FIGS. 18–22 and 25, 26). To maintain the same switching frequency, the on-time of $S_4$ would have to correspondingly increase or decrease by spending more or less time in circuit mode M1. A control circuit (not shown) generating this type of driving waveforms is referred to as an asymmetrical drive circuit. Simulation waveforms of the Boost converter of FIG. 13 using asymmetrical drive is shown in FIG. 47.

Figure 48:
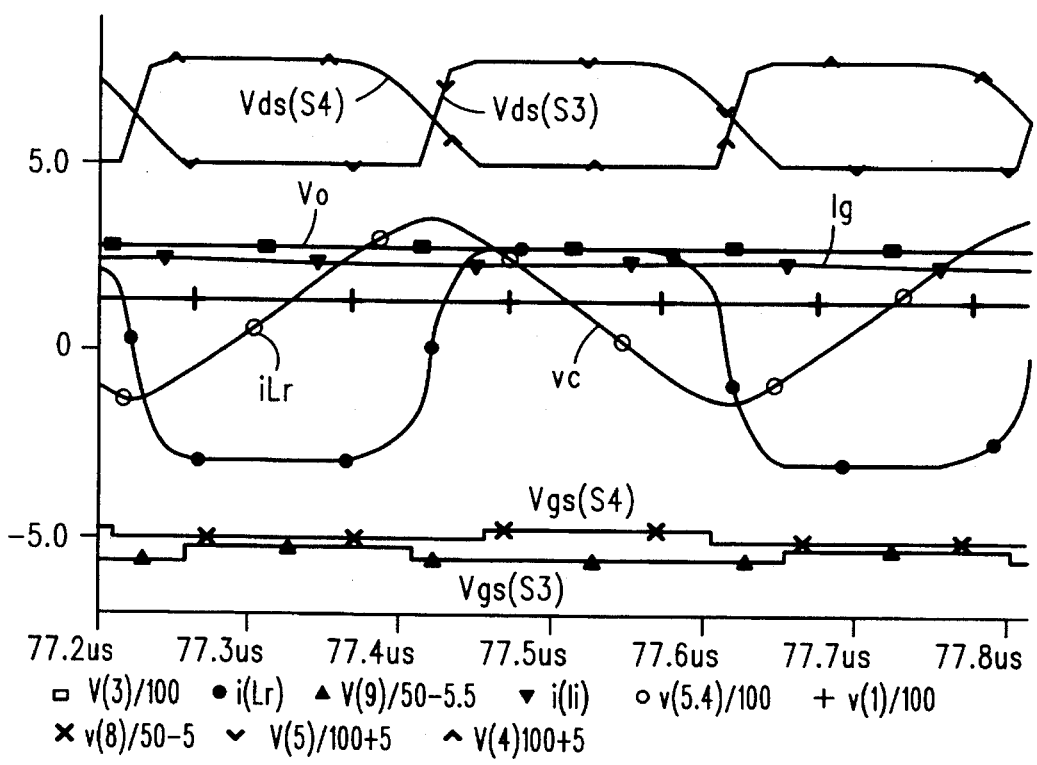
FIG. 48 shows simulated waveforms for the Boost converter of FIG. 13 operated with forced commutation.
Figure 49:
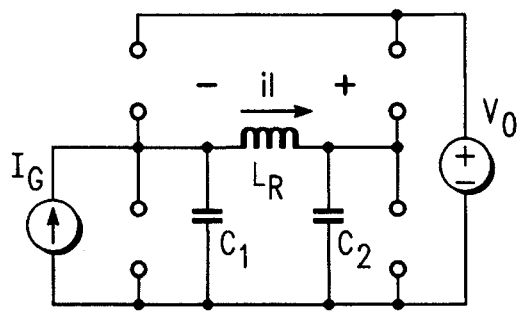
FIG. 49 shows the additional topological circuit mode of the Boost converter of FIG. 13 operated with forced commutation.
Figure 50:
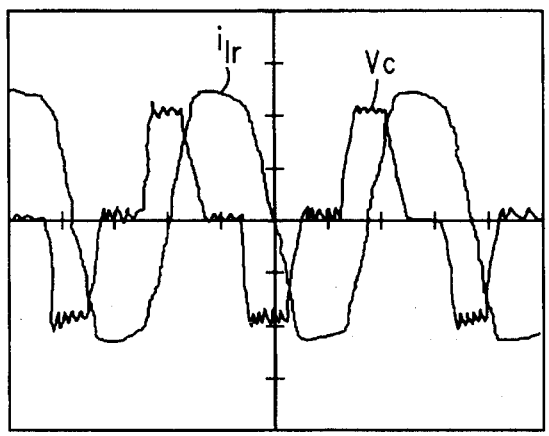
FIGS. 50–55 show experimental waveforms for the Boost converter of FIG. 13.
Figure 51:
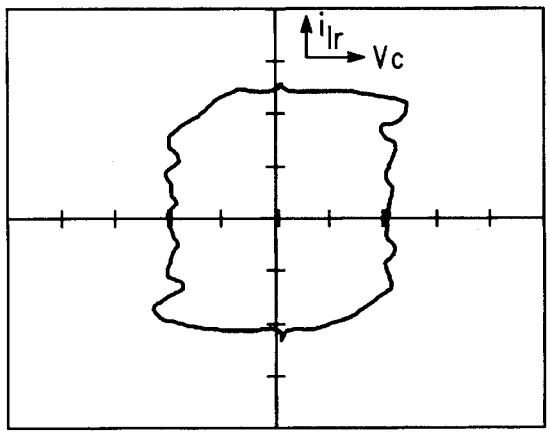
Figure 52:
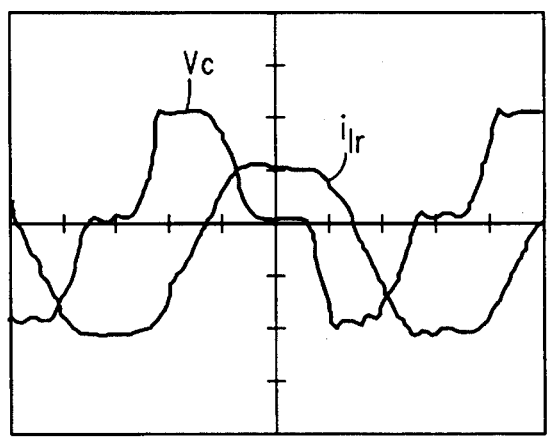
Figure 53:
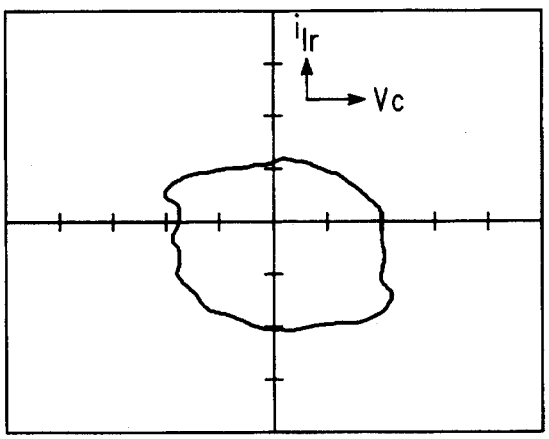
Figure 54:
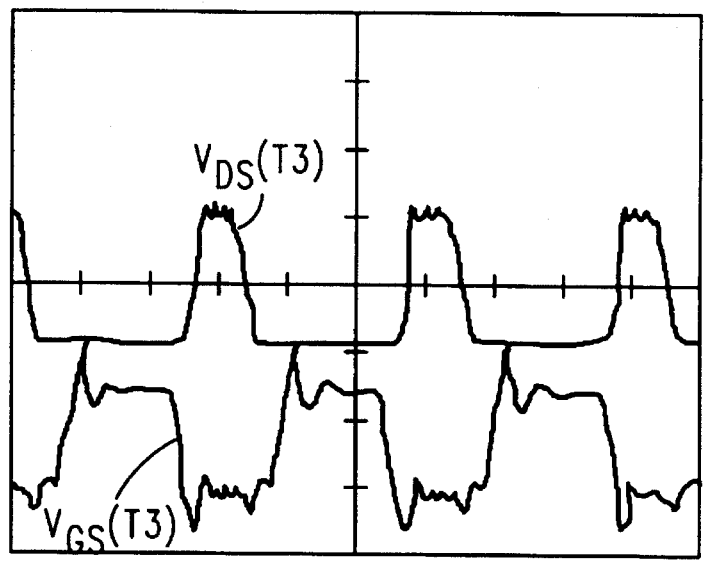
Figure 55:
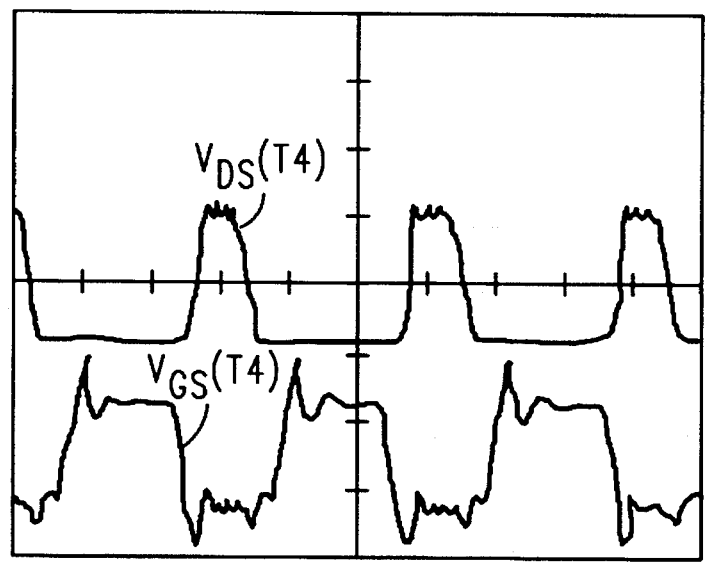

Another variation of the above described invention includes operating the two active switches $S_3$ and $S_4$ near resonance. In other words, the switching frequency of these two switches is increased closer to the natural resonant frequency of the LC tank such that the time spent in circuit mode M1 (between times $t_3$ & $t_4$ and $t_7$ & $t_0+T_s$) is eliminated. This is accomplished by turning $S_4$ off before capacitor voltage $v_C$ reaches zero, and turning $S_3$ off before capacitor voltage $v_C$ reaches zero. The result is that a sixth circuit mode (FIG. 49) is introduced wherein both capacitors $C_1$ and $C_2$ resonate simultaneously with $L_r$. Simulated waveforms of a novel Boost converter operated in this manner are shown in FIG. 48. Converter voltage gain may in this way be decreased without the addition of a third active switch $S_2$.

Design example

An exemplary design of the Boost converter using the resonant switching bridge may be carried out based on the following specifications:

| Input Voltage: | $V_g$ = 24–32 V |
|---|---|
| Output Voltage: | $V_o$ = 48 V |
| Output Power: | $P_o$ = 100–25 W |
| Minimum switching Frequency: | 400 kHz |

Based upon the specifications, the minimum and maximum converter voltage gain may be calculated: $m=V_o/V_g=$ 1.5–2.0. The output load will vary from $R_O$=23–92Ω. Therefor the maximum to minimum load ratio will equal 92/23= 4:1. Referring to the converter voltage gain curves of FIGS. 27–31, we investigate the ability of the converter to operate both over a voltage gain of 1.5–2.0 and a load ratio of 4:1. If k=1.0 is chosen, then over the gain specified, $Q_l$ may range from 0.1 to 2. Choosing $Q_l$(min)=0.5, $Z_O$ may be calculated as $R_O/Q_l$ =23/0.5=46. If $f_s$(min)=400 kHz, then $\omega_O=2f_O=$ $2f_s/f_{sn}$=2*400 kHz/0.3 Rad≈8.38 MRad/Sec. The resonant capacitors $C_1$ and $C_2$ as well as the resonant inductor $L_r$ may be calculated as:

$$C_1 = C_2 = \frac{1}{\omega_o Z_o} = 2.59 nF$$

$$L_r = \frac{Z_o}{\omega_o} - 5.49 \mu H$$

The range of switching frequency for regulating the output voltage may be calculated from $f_{sn}$=0.3–0.8. Therefor the range will be 400 kHz–1067 kHz.

The circulating current in $L_r$ due to the discharging and charging of capacitors $C_1$ and $C_2$ is equal to $V_O/Z_O$=48 V/46≈1 A. The average input current will range from 4.17–3.13 A at full load. If MTD3055EL DPak MOSFETS are used for all active switches, then the total conduction losses between switches $T_3$ and $T_4$ may be approximated as less than 5 Watts at full load and 24 V input. Measured waveforms (not corresponding to this design) are shown in FIGS. 50–55.

I claim:

1. A variable frequency controlled, zero-voltage switched, quasi-resonant converter for receiving power from a DC power source and providing power to a DC load, said converter comprising:

switching bridge means for connecting and disconnecting said power from said DC power source to and from said DC load, said switching bridge comprising:
(a) a resonant inductor having a first end operatively connected to a first node and a second end operatively connected to a second node;
(b) a first diode having an anode operatively connected to said first node and a cathode operatively connected to a third node;
(c) a second diode having an anode operatively connected to said second node and a cathode operatively connected to said third node;
(d) a third diode having an anode operatively connected to a fourth node and a cathode operatively connected to said second node;
(e) a fourth diode having an anode operatively connected to said fourth node and a cathode operatively connected to said first node;
(f) first and second active switch means for connecting and disconnecting said DC power source to and from said DC load, said first active switch means operatively connected across said third diode, said second switch means operatively connected across said fourth diode;
(g) a first resonant capacitor;
(h) a second resonant capacitor;

wherein said first resonant capacitor is operatively connected to said first node such that any voltage change across said first resonant capacitor necessitates a substantially equal voltage change across said fourth diode as represented by $$\frac{d}{dt} v_{first\ resonant\ capacitor} = \frac{d}{dt} v_{fourth\ diode}$$

and wherein said second capacitor is operatively connected to said second node such that any voltage change across said second resonant capacitor necessitates a substantially equal voltage change across said third diode as represented by $$\frac{d}{dt} v_{second\ resonat\ capacitor} = \frac{d}{dt} v_{third\ diode}$$

such that any voltage change across said fourth diode necessitates a substantially equal and opposite voltage change across said first diode;

at least one filtering inductor having first and second ends, said first end operatively connected to said first node, said second end operatively connected to said DC power source;

at least one filtering capacitor operatively connected in parallel with said switching bridge;

a timing means for controlling the turning on and turning off of said first active switch means and said second active switch means such that the turn-on and turn-off of said first active switch means is delayed by an amount equal to the switching period $T_s$ relative to the turn-on and turn-off of said second active switch means, and such that said first active switch means and said second active switch means and said first diode and said second diode turn on and turn off with substantially zero volts across them.

2. The converter of claim 1 wherein said switching bridge further comprises third active switch means for connecting and disconnecting said power source to and from said load, said third active switch means operatively connected across said second diode, such that current conduction through said third active switch means while said second active switch means conducts current assures the turn-on of said first active switch means with substantially zero volts.

3. The converter of claim 1 wherein at least one of said first and second active switch means comprises semiconductor means.

4. The converter of claim 2 wherein at least one of said first, second and third active switch means comprises semiconductor means.

5. A variable frequency controlled, zero-voltage switched, quasi-resonant converter for receiving power from a DC power source and providing power to a DC load, said converter comprising:
  switching bridge means for connecting and disconnecting said power from said DC power source to and from said DC load, said switching bridge comprising:
  (a) a resonant inductor having a first end operatively connected to a first node and a second end operatively connected to a second node;
  (b) a first diode having an anode operatively connected to said first node and a cathode operatively connected to a third node;
  (c) a second diode having an anode operatively connected to said second node and a cathode operatively connected to said third node;
  (d) a third diode having an anode operatively connected to a fourth node and a cathode operatively connected to said second node;
  (e) a fourth diode having an anode operatively connected to said fourth node and a cathode operatively connected to said first node;
  (f) first and second active switch means for connecting and disconnecting said DC power source to and from said DC load, said first active switch means operatively connected across said third diode, said second switch means operatively connected across said fourth diode;
  (g) a first resonant capacitor;
  (h) a second resonant capacitor;

wherein said first resonant capacitor is operatively connected to said first node such that any voltage change across said first resonant capacitor necessitates a substantially equal voltage change across said fourth diode as represented by $$\frac{d}{dt} v_{\text{first resonant capacitor}} = \frac{d}{dt} v_{\text{fourth diode}}$$

and wherein said second capacitor is operatively connected to said second node such that any voltage change across said second resonant capacitor necessitates a substantially equal voltage change across said third diode as represented by $$\frac{d}{dt} v_{\text{second resonant capacitor}} = \frac{d}{dt} v_{\text{third diode}}$$

such that any voltage change across said fourth diode necessitates a substantially equal and opposite voltage change across said first diode;
  at least one filtering inductor having first and second ends, said first end operatively connected to said first node, said second end operatively connected to said DC load;
  at least one filtering capacitor operatively connected in parallel with said switching bridge;
  a timing means for controlling the turning on and turning off of said first active switch means and said second active switch means such that the turn-on and turn-off of said first active switch means is delayed by an amount equal to the switching period $T_s$ relative to the turn-on and turn-off of said second active switch means, and such that said first active switch means and said second active switch means and said first diode and said second diode turn on and turn off with substantially zero volts across them.

6. The converter of claim 5 wherein said switching bridge further comprises third active switch means for connecting and disconnecting said power source to and from said load, said third active switch means operatively connected across said second diode, such that current conduction through said third active switch means while said second active switch means conducts current assures the turn-on of said first active switch means with substantially zero volts.

7. The converter of claim 5 wherein at least one of said first and second active switch means comprises semiconductor means.

8. The converter of claim 6 wherein at least one of said first, second and third active switch means comprises semiconductor means.

* * * * *